G. CHRISTENSON.
PISTON PACKING.
APPLICATION FILED JUNE 8, 1917.
1,320,675.
Patented Nov. 4, 1919.
2 SHEETS—SHEET 1.
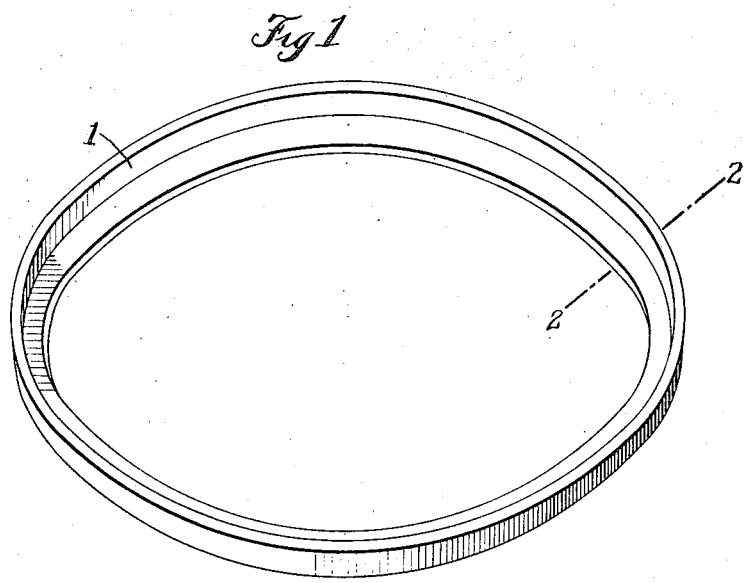
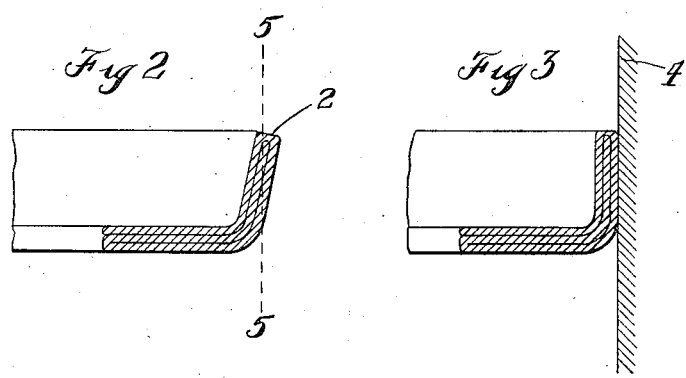
INVENTOR
George Christenson
BY
ATTORNEY G. CHRISTENSON.
PISTON PACKING.
APPLICATION FILED JUNE 8, 1917.
1,320,675. Patented Nov. 4, 1919.
2 SHEETS—SHEET 2.
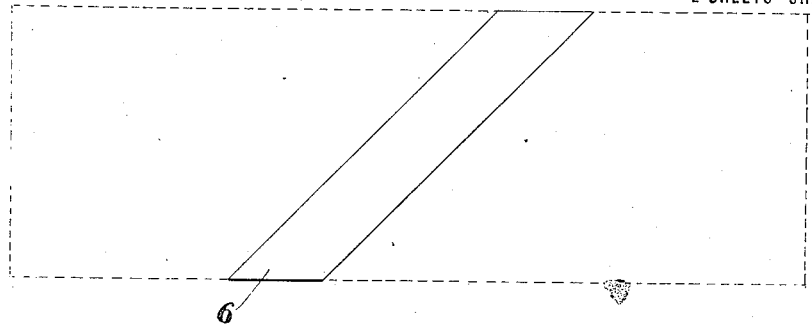
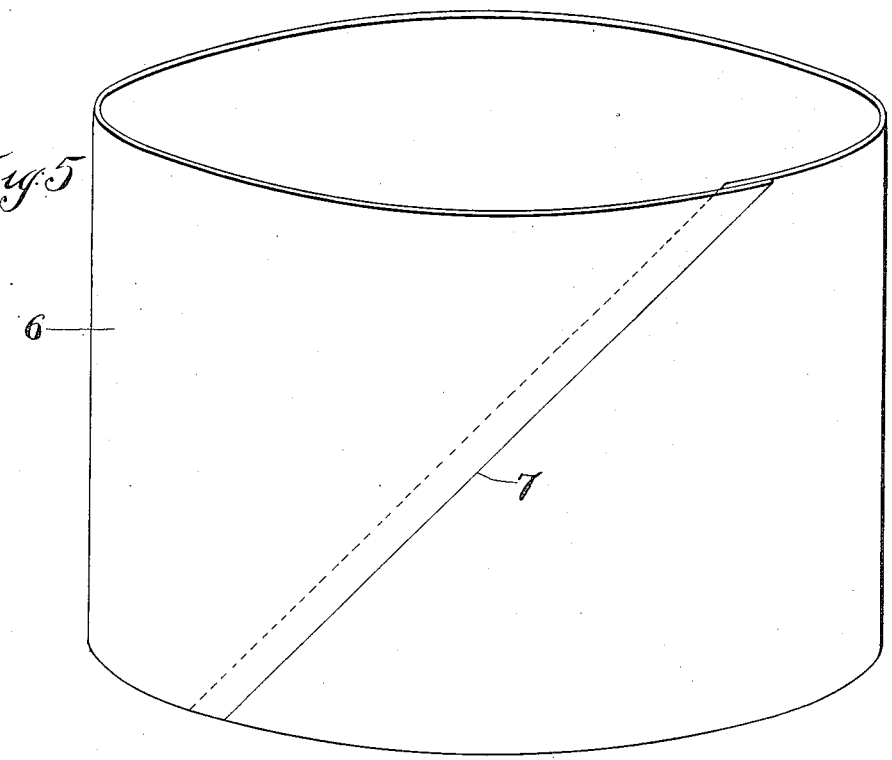
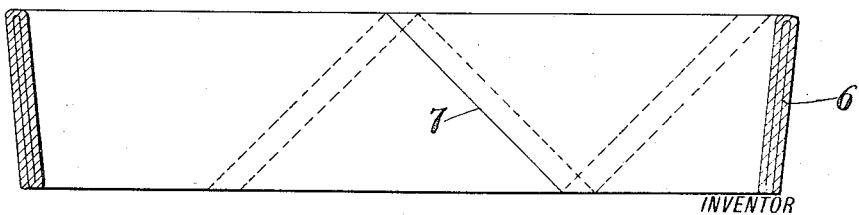
INVENTOR
George Christenson
BY
ATTORNEY

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

PISTON-PACKING.

1,320,675.    Specification of Letters Patent.    Patented Nov. 4, 1919.

Application filed June 8, 1917. Serial No. 173,502.

*To all whom it may concern:*

Be it known that I, GEORGE CHRISTENSON, a citizen of the United States of America, residing at Jamaica, county of Queens, State of New York, have invented certain new and useful Improvements in Piston-Packing, of which the following is a specification.

My invention relates to piston packing and comprises a special form of cup-shaped packing particularly useful on pistons in air brake cylinders. Heretofore cup-shaped packings of leather have been employed in air brake equipment and the use of various forms of elastic expander rings have been required to hold the cylindrical portions of the cups against the cylinder wall so as to prevent leakage. These cup leathers wear out rapidly, and even before wearing out get in such condition from porosity that leakage of air rapidly increases. This difficulty is aggravated by the fact that the Interstate Commerce regulations now require that such leakage shall not occur in engine brakes to an extent creating a fall of more than a few pounds pressure within a given time, and have thus established a standard with which cup leathers cannot comply. I have, after long experiment, discovered a form of packing which is involved in my present invention and which under prolonged test has retained the air pressure in the brake cylinder even after being subjected to several hundred thousand cycles of operation. One form of packing embodying my invention is illustrated in the accompanying sheet of drawings in which—

Figure 1 is a perspective view of a cup-shaped packing embodying my invention.

Fig. 2 is a cross section on line 2—2 of Fig. 1.

Fig. 3 is a similar cross section showing the position the parts assume when in use, a section of a portion of a cylinder wall being also shown.

Fig. 4 represents a strip of cloth from which the ring is preferably made.

Fig. 5 shows on an enlarged scale the same formed into an endless band, and

Fig. 6 is a cross section of the said band after folding, but before it has been shaped by the dies to form the completed packing.

Throughout the drawings like reference characters indicate like parts. 1, represents generally the completed cup-shaped packing ring. 2, is the bight formed by the bending of the two outer of the three plies of fabric preferably used to form the ring. Preferably the lip of the packing, *i. e.*, the substantially cylindrical portion of the cup, is given a slight upward flare as illustrated in Fig. 2, where the dotted line 5—5 indicates the position the outer surface of the cup would assume if the packing were bent to an exact cylindrical form such as it must assume when forced for use into a cylinder. A portion of the wall of such cylinder is indicated at 4, in Fig. 3, and the positions of the parts of my packing assumed in use therein are shown in said figure of drawing.

After the ring has been vulcanized in the shape shown in Fig. 1 and Fig. 2, it becomes a solid body and the flaring lip of the cup presents a considerable elastic resistance to the reduction of its diameter caused by forcing it into the position for use shown in Fig. 3, so that a very tight fit against the cylinder walls is assured both initially and during long use.

Figs. 4 to 6 illustrate some of the steps in the preferred method of making the packing. 6, is a strip cut on the bias from a piece of asbestos cloth indicated in dotted lines in Fig. 4. This strip 6, is next formed into an endless band, as shown in Fig. 5, the abutting ends being overlapped and cemented together, as indicated at 7. The parts are then folded preferably so as to form a three-ply ring and pulled out so as to give the ring the flaring or coned shape indicated in Fig. 6. The cemented, lapped joint 7, is by the foregoing procedure given a position diagonal of the ring body, the portions of the laps in the different plies breaking joints as indicated in Fig. 6. The cloth has been treated with a rubber solution at the proper stage, usually before cutting, and this acts as a vulcanizing medium. The ring shown in Fig. 6 is finally placed in dies of the proper shape to form the completed packing shown in Fig. 1, and vulcanized by the application of heat while under pressure either in the dies, or elsewhere. The result is a packing ring formed of a dense, homogeneous mass of vulcanized mineral fiber which has much of the toughness and resiliency of gutta percha and which is practically indestructible in use, no matter what the conditions of heat and moisture are, within reasonable limits.

The feature of resistance to heat is most important, especially in engine brakes, as the high temperature conditions under which these work are most destructive to ordinary piston packing.

The folding of the cloth so that the bight 2, of the outer plies comes at the lip of the packing i. e., at the outer edge of the cup is important because it leaves no raw edges at this point of greatest wear, but presents a smooth, continuous surface around the entire circumference of the lip, both outside and inside.

The method of forming the endless band out of a strip cut on the bias produces a ring in which both the warp and woof threads run diagonally across the edge of the cup greatly strengthening that point at which strength is most needed. This arrangement of threads also allows the band to be easily given the flaring shape shown in Fig. 6.

Having described my invention, I claim:

A cup-shaped packing ring formed of a strip of woven mineral fabric in which the warp and weft threads run diagonally of the strip, said fabric containing a solution of rubber vulcanized into its fibers, and constituting an impervious cementing film between adjacent layers and a waterproof covering for the exposed surfaces, the ends of said strip being fastened together to form an endless band, said endless band being folded on itself to form a two or more ply structure, being retained in shape by vulcanization while in a shaped state of the contained rubber, and having the bight formed by the outer folds at the edge of the cup.

GEORGE CHRISTENSON.